United States Patent
Huang et al.

(10) Patent No.: US 10,439,736 B2
(45) Date of Patent: Oct. 8, 2019

(54) OPTICAL SWITCH CONTROL METHOD, AND APPARATUS

(71) Applicant: Huawei Technologies Co., Ltd., Shenzhen, Guangdong (CN)

(72) Inventors: Yongbing Huang, Beijing (CN); Tongtong Cao, Beijing (CN); Qinfen Hao, Beijing (CN); Shuncheng Pan, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/846,139

(22) Filed: Dec. 18, 2017

(65) Prior Publication Data

US 2018/0109327 A1 Apr. 19, 2018

Related U.S. Application Data

(63) Continuation of application No. PCT/CN2015/081967, filed on Jun. 19, 2015.

(51) Int. Cl.
*G06F 15/80* (2006.01)
*H04B 10/80* (2013.01)
(Continued)

(52) U.S. Cl.
CPC ....... *H04B 10/801* (2013.01); *G06F 12/0833* (2013.01); *G06F 15/80* (2013.01); *H04Q 11/00* (2013.01); *H04Q 11/0062* (2013.01)

(58) Field of Classification Search
CPC ..... G06F 12/0833; G06F 15/80; H04Q 11/00; H04Q 11/0062; H04B 10/801
See application file for complete search history.

(56) References Cited

U.S. PATENT DOCUMENTS 7,499,468 B2 * 3/2009 Montgomery, Jr. .... H04J 3/085
370/453
9,425,893 B1 * 8/2016 Srinivasan ........... H04B 10/032
(Continued)

FOREIGN PATENT DOCUMENTS

CN 1456994 A 11/2003
CN 101005322 A 7/2007
(Continued)

OTHER PUBLICATIONS

Wen; "Modeling Performance and Energy Consumption of Silicon Photonic Interconnection Networks via Analytical Cache Models" Workshop on Modeling and Simulation of Systems and Applications; Aug. 2014; Total 3 pages.

*Primary Examiner* — Henry Tsai
*Assistant Examiner* — Christopher Daley
(74) *Attorney, Agent, or Firm* — Womble Bond Dickinson (US) LLP (57) ABSTRACT

An optical switch control method and an apparatus are disclosed, to reduce impact on access performance by time overheads of optical link switching. The method includes: receiving an optical link establishment request sent by a computation node; determining whether the first optical link that needs to be established conflicts with the existing optical link; and if the first optical link that needs to be established conflicts with the existing optical link, determining whether to allow establishment of the first optical link, and establishing the first optical link if the establishment of the first optical link is allowed; or establishing the first optical link if the first optical link that needs to be established does not conflict with the existing optical link.

18 Claims, 5 Drawing Sheets

(51) Int. Cl.
    *G06F 12/0831*     (2016.01)
    *H04Q 11/00*     (2006.01)

(56) References Cited

U.S. PATENT DOCUMENTS

| | | |
|---|---|---|
| 2007/0172236 A1 | 7/2007 | Nomura et al. |
| 2012/0063776 A1 | 3/2012 | Xia et al. |
| 2012/0128347 A1* | 5/2012 | Sakamoto ........... H04J 14/0204 398/9 |
| 2013/0177323 A1 | 7/2013 | Kim et al. |
| 2015/0026432 A1 | 1/2015 | Borkenhagen et al. |
| 2015/0055650 A1* | 2/2015 | Bhat .................... H04L 12/185 370/390 |
| 2015/0180579 A1* | 6/2015 | Tajima .................. H04B 10/40 398/135 |
| 2016/0087849 A1* | 3/2016 | Balasubramanian ... H04L 41/12 709/221 |
| 2016/0234578 A1* | 8/2016 | Sareen ............... H04Q 11/0062 |
| 2017/0085971 A1* | 3/2017 | Yang ................. H04Q 11/0066 |

FOREIGN PATENT DOCUMENTS

| | | |
|---|---|---|
| CN | 101589322 A | 11/2009 |
| CN | 102104397 A | 6/2011 |
| CN | 103107943 A | 5/2013 |
| CN | 103281127 A | 9/2013 |
| CN | 104166597 A | 11/2014 |
| JP | 2005064950 A | 3/2005 |

\* cited by examiner

OPTICAL SWITCH CONTROL METHOD, AND APPARATUS

CROSS-REFERENCE TO RELATED APPLICATIONS

This application is a continuation of International Application No. PCT/CN2015/081967, filed on Jun. 19, 2015, the disclosure of which is hereby incorporated by reference in its entirety.

TECHNICAL FIELD

The present application relates to the field of optical communications technologies, and in particular, to an optical switch control method and an apparatus.

BACKGROUND

In a computer system, a processor and a storage (including a memory) are two indispensable components. As a data processing amount of an application program (such as a big data type application) continuously increases, a requirement of the computer system on a capacity, a bandwidth, and the like of a storage system (including a memory system) accordingly increases. In a conventional computer system, a memory and a processor are integrated on a same node, and this manner limits scalability of a capacity and a bandwidth of a memory system. Therefore, in an existing computer system, a memory node exists as a standalone node. In this specification, it is defined as follows: A computation node is similar to a conventional node and mainly provides a processor resource, and a memory node is a node that specifically provides a memory resource. The computation node and the memory node are interconnected by using a network (which may be an electrical network, or an optical network), to form a complete computer system.

An all-optical switching network in a computer system means that an optical fiber or a waveguide is used as a medium for transmitting a signal between a computation node (such as a processor) and a memory node (such as a storage). In the all-optical switching network, data transmission is performed all by using an optical signal instead of an electrical signal. In the computer system set up by using the all-optical switching network, a fiber interconnection between the computation node and the memory node is implemented by using an optical switch chip, to provide the computation node with a large-capacity memory system and a data channel having an ultra-high bandwidth.

Figure 1:
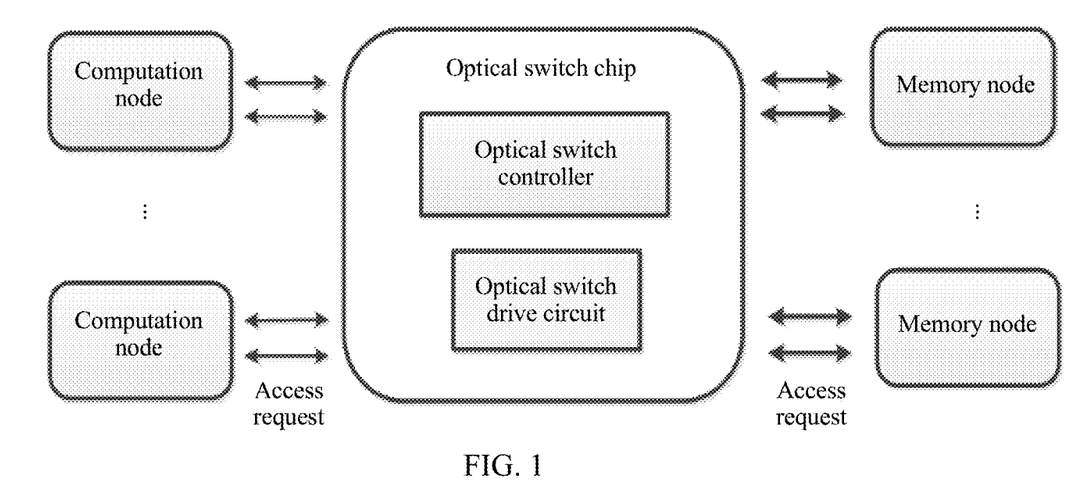
FIG. 1 is a schematic diagram of using circuit switching by an optical switch chip.

FIG. 1 shows a typical computer system set up by using an all-optical switching network. The computer system mainly includes a computation node, a memory node, and an optical switch chip. The computation node mainly includes a processor and a cache. The computation node may run an application program, and read data in the memory node according to an access requirement of the application program. The memory node mainly includes a memory module and control logic, and the control logic is used to implement a read/write operation on data in the memory module according to an access request of the computation node.

Data transmission is performed on different data transmission links in the network by using a switch chip or a switching chip, and mainly includes two manners: circuit switching and packet switching. Circuit switching means that the switch chip establishes a physical channel between two ports: an egress and an ingress that are corresponding to a communication-required computation node and/or a memory node. Packet switching means that a data request of a computation node or a memory node is sent to a buffer of the switching chip in a form of a packet, and the switching chip sends the packet from a corresponding egress to a corresponding memory node or computation node according to specified control logic and a specified policy. Because an optical signal cannot be buffered, the optical signal needs to be converted into an electrical signal for buffering in an optical switching network, that is, optical-to-electrical signal conversion and electrical-to-optical signal conversion need to be introduced.

To implement all-optical switching, the optical switch chip in FIG. 1 uses the circuit switching manner. When a memory node communicating with a computation node (such as a computation node A) is changed (for example, an original memory node is a memory node A, and a changed memory node is a memory node B), that is, when a communications link between the computation node and the memory node is switched (that is, is switched from a link between the computation node A and the memory node A to a link between the computation node A and the memory node B), the optical switch chip needs to disables a physical channel of a related optical link (that is, disables a physical channel between the computation node A and the memory node A), re-allocate a physical channel to a corresponding computation node and memory node, and establish a new optical link between the computation node and the memory node (that is, re-allocate a physical channel between the computation node A and the memory node B).

Due to limitation of an existing optical module, optical link re-establishment introduces a large quantity of time overheads. The time overheads mainly include three parts: a link re-arrangement time, an optical receiver lock time, and a data link switching and recovery time. The link re-arrangement time is defined as a time required for disconnecting an original optical link and establishing a new optical link. The optical receiver lock time is defined as a required time from establishment of the new optical link to a time point at which an optical receiver can stably receive an optical signal. The data link switching and recovery time is defined as a verification code sending and receiving time required for ensuring that data can be correctly received on the new optical link. For an optical link whose bandwidth is 25 Gbit/second (b/s), an optical link re-establishment time requires several milliseconds. However, generally, a delay of accessing a memory node by a computation node is only hundreds of nanoseconds approximately. Consequently, the optical link re-establishment time greatly deteriorates access performance, and further deteriorates application running performance of the computation node.

It can be learned that, how to reduce impact on access performance by time overheads of optical link switching is extremely important for a computer system using all-optical circuit switching.

Currently, a time delay of optical link re-establishment is mainly reduced by optimizing optical link hardware. First, an optical switch in an optical link, a drive circuit of the optical switch, and the like are optimized, to reduce the link re-arrangement time. Second, a clock and data recovery (CDR) component, a transimpedance amplifier (TIA) component, a limiting amplifier (LA) component, and the like in an optical link receiving module are improved, to reduce a signal lock time of each component after establishment of a new link. However, due to limitation of a process and a technology, reducing the time delay of optical link re-establishment by optimizing the optical link hardware has a limited effect, and is difficult to achieve a relatively great progress within a short period of time.

SUMMARY

Embodiments of the present disclosure provide an optical switch control method and an apparatus, to reduce impact on access performance by time overheads of optical link switching.

Specific technical solutions provided in the embodiments of the present disclosure are as follows:

According to a first aspect, an optical switch control method is provided, including:

receiving, by an optical switch chip, an optical link establishment request sent by a computation node, where the optical link establishment request carries an identifier of the computation node, an identifier of a memory node that needs to be accessed by the computation node, and priority indication information of a first optical link that needs to be established between the computation node and the memory node that needs to be accessed by the computation node; and determining, by the optical switch chip according to information about an existing optical link and the priority indication information of the first optical link that needs to be established, whether the first optical link that needs to be established conflicts with the existing optical link; and if the first optical link that needs to be established conflicts with the existing optical link, determining, according to the priority indication information of the first optical link, priority indication information of the existing optical link, and link switching overheads of a conflicting optical link, whether to allow establishment of the first optical link, and establishing the first optical link if the establishment of the first optical link is allowed; or establishing the first optical link if the first optical link that needs to be established does not conflict with the existing optical link.

With reference to the first aspect, in a first possible implementation, the determining, by the optical switch chip, whether the first optical link that needs to be established conflicts with the existing optical link includes:

if determining that the first optical link that needs to be established and the existing optical link have a same optical fiber or port, determining, by the optical switch chip, that the first optical link that needs to be established conflicts with the existing optical link; or if determining that the first optical link that needs to be established and the existing optical link do not have a same optical fiber or port, determining that the first optical link that needs to be established does not conflict with the existing optical link.

With reference to the first possible implementation of the first aspect, in a second possible implementation, the determining, by the optical switch chip according to the priority indication information of the first optical link, priority indication information of the existing optical link, and link switching overheads of a conflicting optical link, whether to allow establishment of the first optical link includes:

determining, by the optical switch chip, whether the link switching overheads of the conflicting optical link are greater than a preset value; and if the link switching overheads of the conflicting optical link are greater than the preset value, disallowing the establishment of the first optical link; or if the link switching overheads of the conflicting optical link are not greater than the preset value, determining, according to the priority indication information of the first optical link and priority indication information of the conflicting optical link, whether a priority of the first optical link is higher than a priority of the conflicting optical link; and allowing the establishment of the first optical link if the priority of the first optical link is higher than the priority of the conflicting optical link; or disallowing the establishment of the first optical link if the priority of the first optical link is not higher than the priority of the conflicting optical link.

With reference to any one of the first aspect, the first possible implementation, or the second possible implementation, in a third possible implementation, the link switching overheads of the conflicting optical link are determined according to a link re-arrangement time, an optical receiver lock time, and a data link switching and recovery time.

According to a second aspect, an optical switch control method is provided, applied to communication between a computation node and a memory node, where an optical link for communication is established between the computation node and the memory node by using an optical switch chip, and the method includes:

receiving, by the computation node, a request for accessing a memory node in one or more time periods, and obtaining an identifier and an access feature of the memory node accessed in the one or more time periods, where the access feature includes any one or a combination of multiple of a bandwidth of the accessed memory node, address distribution of the accessed memory node, a distribution status of access requests corresponding to different amounts of data, and a ratio of requests for reading data from the memory node to requests for writing data into the memory node;

searching, by the computation node, a phase feature library according to the identifier and the access feature of the memory node accessed in the one or more time periods, where the phase feature library stores an identifier and an access feature of each memory node that needs to be accessed by the computation node in each time period in each processing phase; determining, from the phase feature library, a processing phase to which a time period matching the identifier and the access feature of the memory node accessed in the one or more time periods belongs; and obtaining an identifier and an access feature of each memory node that needs to be accessed in a next time period of the matched time period in the determined processing phase;

determining, by the computation node according to a quantized value corresponding to the access feature of each memory node that needs to be accessed in the next time period, priority indication information of an optical link that needs to be established between the computation node and each memory node that needs to be accessed in the next time period; and generating, by the computation node, an optical link establishment request, and sending the optical link establishment request to the optical switch chip, where the optical link establishment request carries an identifier of the computation node and the identifier of each memory node that needs to be accessed in the next time period, and carries the priority indication information of the optical link that needs to be established in the next time period between the computation node and each memory node that needs to be accessed.

With reference to the second aspect, in a first possible implementation, the searching, by the computation node, a phase feature library according to the identifier and the access feature of the memory node accessed in the one or more time periods, and determining, from the phase feature library, a processing phase to which a time period matching the identifier and the access feature of the memory node accessed in the one or more time periods belongs includes:

searching, by the computation node, data in a table of the phase feature library, determining data that is in the table and matches the identifier and the access feature of the memory node accessed in the one or more time periods, and determining a processing phase corresponding to the matched data in the table.

According to a third aspect, an optical switch chip is provided, including:

a receiving module, configured to receive an optical link establishment request sent by a computation node, where the optical link establishment request carries an identifier of the computation node, an identifier of a memory node that needs to be accessed by the computation node, and priority indication information of a first optical link that needs to be established between the computation node and the memory node that needs to be accessed by the computation node; and an optical link control module, configured to: determine, according to information about an existing optical link and the priority indication information of the first optical link that needs to be established, whether the first optical link that needs to be established conflicts with the existing optical link; and if the first optical link that needs to be established conflicts with the existing optical link, determine, according to the priority indication information of the first optical link, priority indication information of the existing optical link, and link switching overheads of a conflicting optical link, whether to allow establishment of the first optical link, and establish the first optical link if the establishment of the first optical link is allowed; or establish the first optical link if the first optical link that needs to be established does not conflict with the existing optical link.

With reference to the third aspect, in a first possible implementation, the optical link control module is specifically configured to:

if determining that the first optical link that needs to be established and the existing optical link have a same optical fiber or port, determine that the first optical link that needs to be established conflicts with the existing optical link; or if determining that the first optical link that needs to be established and the existing optical link do not have a same optical fiber or port, determine that the first optical link that needs to be established does not conflict with the existing optical link.

With reference to the first possible implementation of the third aspect, in a second possible implementation, the optical link control module is specifically configured to:

determine whether the link switching overheads of the conflicting optical link are greater than a preset value; and if the link switching overheads of the conflicting optical link are greater than the preset value, disallow the establishment of the first optical link; or if the link switching overheads of the conflicting optical link are not greater than the preset value, determine, according to the priority indication information of the first optical link and priority indication information of the conflicting optical link, whether a priority of the first optical link is higher than a priority of the conflicting optical link; and allow the establishment of the first optical link if the priority of the first optical link is higher than the priority of the conflicting optical link; or disallow the establishment of the first optical link if the priority of the first optical link is not higher than the priority of the conflicting optical link.

With reference to any one of the third aspect, the first possible implementation, or the second possible implementation, in a third possible implementation, the link switching overheads of the conflicting optical link are determined according to a link re-arrangement time, an optical receiver lock time, and a data link switching and recovery time.

According to a fourth aspect, a computation node is provided, including:

an obtaining module, configured to: receive a request for accessing a memory node in one or more time periods, and obtain an identifier and an access feature of the memory node accessed in the one or more time periods, where the access feature includes any one or a combination of multiple of a bandwidth of the accessed memory node, address distribution of the accessed memory node, a distribution status of access requests corresponding to different amounts of data, and a ratio of requests for reading data from the memory node to requests for writing data into the memory node;

a query module, configured to: search a phase feature library according to the identifier and the access feature of the memory node accessed in the one or more time periods, where the phase feature library stores an identifier and an access feature of each memory node that needs to be accessed by the computation node in each time period in each processing phase; determine, from the phase feature library, a processing phase to which a time period matching the identifier and the access feature of the memory node accessed in the one or more time periods belongs; and obtain an identifier and an access feature of each memory node that needs to be accessed in a next time period of the matched time period in the determined processing phase;

a priority determining module, configured to determine, according to a quantized value corresponding to the access feature of each memory node that needs to be accessed in the next time period, priority indication information of an optical link that needs to be established between the computation node and each memory node that needs to be accessed in the next time period; and a sending module, configured to: generate an optical link establishment request, and send the optical link establishment request to an optical switch chip, where the optical link establishment request carries an identifier of the computation node and the identifier of each memory node that needs to be accessed in the next time period, and carries the priority indication information of the optical link that needs to be established in the next time period between the computation node and each memory node that needs to be accessed.

With reference to the fourth aspect, in a first possible implementation, the query module is specifically configured to:

search data in a table of the phase feature library, determine data that is in the table and matches the identifier and the access feature of the memory node accessed in the one or more time periods, and determine a processing phase corresponding to the matched data in the table.

Based on the foregoing technical solutions, in the embodiments of the present disclosure, the computation node predicts an identifier and an access feature of a memory node to be accessed in the next time period; generates the optical link establishment request according to the identifier and the access feature that are of the memory node to be accessed in the next time period and are obtained by means of prediction; and sends the optical link establishment request to the optical switch chip. The optical switch chip establishes in advance an optical link between the computation node and the memory node according to the optical link establishment request. This reduces impact on access performance by a time delay caused by optical link switching performed by the optical switch chip.

DETAILED DESCRIPTION

To make the objectives, technical solutions, and advantages of the present disclosure clearer, the following further describes the present disclosure in detail with reference to the accompanying drawings. Apparently, the described embodiments are only some rather than all of the embodiments of the present disclosure. All other embodiments obtained by a person of ordinary skill in the art based on the embodiments of the present disclosure without creative efforts shall fall within the protection scope of the present disclosure.

A main idea of the present disclosure is as follows: A computation node monitors, analyzes, and predicts an access behavior on a memory node, and sends an optical link advance establishment request to an optical switch chip; and the optical switch chip establishes in advance an optical link between the computation node and the corresponding memory node according to the optical link advance establishment request from the computation node. In a manner of establishing an optical link in advance, impact on access performance by time overheads of optical link switching is reduced.

An application scenario of the embodiments of the present disclosure is a computer system including an all-optical switching network, and the computer system mainly includes one or more computation nodes, one or more memory nodes, and one or more optical switch chips. A computation node and a memory node are interconnected by using the optical switch chip, and the optical switch chip is responsible for establishing an optical link between the computation node and a corresponding memory node.

Figure 2:
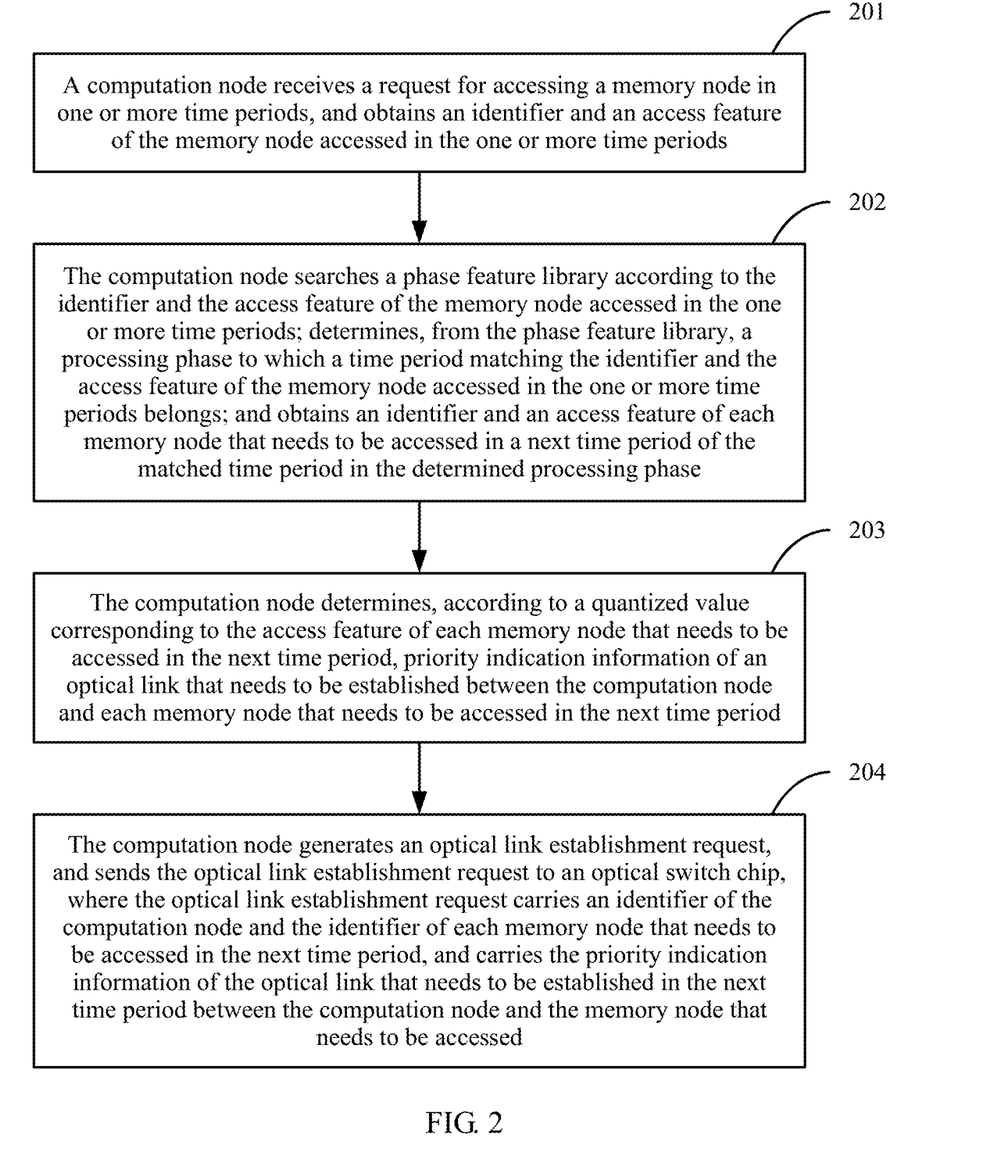
FIG. 2 is a schematic flowchart of executing an optical switch control method by a computation node according to an embodiment of the present disclosure.

In an embodiment of the present disclosure, as shown in FIG. 2, a detailed method process in which a computation node performs optical switch control is as follows.

Step 201: The computation node receives a request for accessing a memory node in one or more time periods, and obtains an identifier and an access feature of the memory node accessed in the one or more time periods.

During implementation, the request for accessing a memory node in one or more time periods is a request for accessing a memory node in current one or more consecutive time periods.

The access feature includes but is not limited to any one or a combination of multiple of the following items: a bandwidth of the accessed memory node, address distribution of the accessed memory node, a distribution status of access requests corresponding to different amounts of data, and a ratio of requests for reading data from the memory node to requests for writing data into the memory node. It should be noted that only representative access features are enumerated herein, and other access features may further be included in actual application. For the other access features, refer to the access features enumerated herein, to apply to this embodiment. The other access features are not further listed one by one.

A size of data corresponding to an access request is a size of data that the access request is used to request to access. The distribution status of access requests corresponding to different amounts of data is a ratio between sizes of access data corresponding to all access requests. During implementation, the distribution status of access requests corresponding to different amounts of data may be a ratio between quantities of access requests belonging to different data ranges.

Step 202: The computation node searches a phase feature library according to the identifier and the access feature of the memory node accessed in the one or more time periods; determines, from the phase feature library, a processing phase to which a time period matching the identifier and the access feature of the memory node accessed in the one or more time periods belongs; and obtains an identifier and an access feature of each memory node that needs to be accessed in a next time period of the matched time period in the determined processing phase.

The phase feature library stores an identifier and an access feature of each memory node that needs to be accessed by the computation node in each time period in each processing phase.

A processing phase is a part of an entire processing process of the computation node. During a processing phase, an identifier and an access feature of a memory node accessed in each time period corresponding to the processing phase are cyclically executed.

In this embodiment of the present disclosure, before obtaining the request for accessing a memory node in one or more time periods, the computation node determines the phase feature library. A specific process of determining the phase feature library is as follows:

The computation node obtains an identifier and an access feature of a memory node accessed in each time period, clusters all the time periods according to the access feature in each time period, and divides a processing process of the computation node into multiple processing phases according to a clustering result, where each processing phase includes identifiers and access features of memory nodes accessed in an integer quantity of time periods, so as to obtain the phase feature library.

Each category obtained by means of clustering is corresponding to one processing phase. Consistency exists in features of memory nodes accessed in all time periods corresponding to one processing phase. The consistency means that representative access features in access features in multiple time periods belonging to one processing phase are the same. For example, access bandwidths in multiple time periods belonging to one processing phase are all greater than a threshold or are all less than a threshold. Alternatively, a same memory node is accessed in multiple time periods belonging to one processing phase, and an address of the accessed memory node is contiguous. Alternatively, sizes of data that access requests are used to access in multiple time periods belonging to one processing phase is greater than a threshold or is less than a threshold. Alternatively, ratios that are of requests for reading data from a memory node to requests for writing data into the memory node and that are in multiple time periods belonging to one processing phase are all greater than a threshold or are all less than a threshold.

During specific implementation, the computation node searches data in a table of the phase feature library, determines data that is in the table and matches the identifier and the access feature of the memory node accessed in the one or more time periods, and determines a processing phase corresponding to the matched data in the table.

The phase feature library is specified to each computation node, and tables of phase feature libraries of different computation nodes have different content. A format of the table of the phase feature library is shown in Table 1, and a correspondence among a processing phase number, a time period, and a memory node identifier and a corresponding access feature is stored in the table.

TABLE 1

| Processing phase number | 1 | | | | 2 | | | | ... | K | |
|---|---|---|---|---|---|---|---|---|---|---|---|
| Time period | T1 | T1 + P | T1 + 2P | T1 + 3P | T2 | T2 + P | T2 + 2P | T2 + 3P | | TK | TK + P |
| Memory node identifier and access feature | <N1, F11> | <N3, F12> | <N1, F13> | <N4, F14> | <N5, F21> | <N6, F22> | <N4, F23> | <N1, F24> | | <N8, F31> | <N2, F32> |

During specific implementation, an identifier and an access feature of a memory node accessed by the computation node are monitored and recorded according to a time period. The feature of the memory node accessed by the computation node may be monitored by using a computation node, a single processor, a single application or process, or the like as a granularity. That a computation node is used as the monitoring granularity means that a memory node access request sent from the entire computation node is monitored without differentiating a specific application load corresponding to the memory node access request, a processor of the specific application load, and the like. If a computation node is used as the monitoring granularity, neither a processor sending the memory node access request nor an application sending the memory node access request needs to be differentiated, so that the monitoring granularity is large, and overheads are low. If a single processor is used as the monitoring granularity, a processor triggering a current memory node access request needs to be differentiated. If a single application or process is used as the monitoring granularity, an application or a process to which each memory node access request belongs needs to be analyzed. In this monitoring manner, interference between memory node access requests of different applications can be reduced, and accuracy of an analyzed phase feature can be improved.

The clustering of all the time periods according to the access feature in each time period may be implemented by using a clustering algorithm, a machine learning algorithm, and/or a deep mining algorithm, and is not limited thereto in practice; or may be implemented by using another related algorithm or logic. For example, a K-means clustering algorithm can be used to extract a representative access feature from access features in multiple consecutive time periods, and cluster all time periods according to the representative access feature, to obtain multiple categories. Each category is corresponding to one processing phase. The representative access feature is an access feature that regularly varies with the time period. During implementation, there may be one or more representative access features.

Table 1 includes K processing phases, and a value range of the processing phase number is a positive integer from 1 to K. Each processing phase may include one or more time periods. In table 1, P represents the time period, and T1, T2, . . . , TK represent time points. Each time period is corresponding to a (memory node identifier, access feature) pair that indicates an identifier and an access feature of a memory node accessed by the computation node in the time period. If there are multiple access features of one memory node accessed in one time period, the multiple access features need to be integrated, and a representative access feature such as F11 or F22 is extracted.

During specific implementation, specific steps of searching the phase feature library are as follows:

In the first step, an identifier and an access feature of a memory node accessed in current one or more time periods are monitored, to obtain one or more (memory node identifier, access feature) pairs.

In the second step, the one or more (memory node identifier, access feature) pairs obtained in the first step are used as an input, and are compared with all (memory node identifier, access feature) pairs recorded in the table shown in Table 1, to find a (memory node identifier, access feature) pair with a highest matching degree. A comparison method may be similar to a character string matching method. For example, it is assumed that newly obtained (memory node identifier, access feature) pairs in three time periods match (memory node identifier, access feature) pairs in time periods T1, (T1+P), and (T1+2P) in the table. In this case, it is predicted that an access feature in a next time period is the same as an access feature in a time period (T1+3P), and the access feature in the time period (T1+3P) is used as an output. If no matched phase feature is found, prediction is not performed, and an output result is empty. For example, it is assumed that a processing phase is cyclically executed in a period of time, and it is assumed that newly obtained (memory node identifier, access feature) pairs in three time periods successively match (memory node identifier, access feature) pairs in time periods (T1+2P), (T1+3P), and T1 in the table. In this case, it is predicted that an access feature in a next time period is the same as an access feature in a time period (T1+P).

Step 203: The computation node determines, according to a quantized value corresponding to the access feature of each memory node that needs to be accessed in the next time period, priority indication information of an optical link that needs to be established between the computation node and each memory node that needs to be accessed in the next time period.

During implementation, if only a bandwidth of an accessed memory node in an access feature is considered, according to a quantized value corresponding to a bandwidth of a to-be-accessed memory node in an access feature in the next time period, priority indication information of an optical link that needs to be established between the computation node and the memory node is determined. For example, the priority indication information of the optical link that needs to be established between the computation node and the memory node is W=ax, a is a weighting coefficient, and x is the quantized value corresponding to the bandwidth of the to-be-accessed memory node in the access feature in the next time period. A higher access bandwidth in the feature of the memory node to be accessed by the computation node indicates a higher priority of the optical link that needs to be established between the computation node and the memory node.

If only a data size that is corresponding to an access request of accessing a memory node and that is in an access feature is considered, according to a quantized value corresponding to a data size that is corresponding to an access request of accessing a memory node and that is in an access feature in the next time period, priority indication information of an optical link that needs to be established between the computation node and the memory node is determined. For example, the priority indication information of the optical link that needs to be established between the computation node and the memory node is W=by, b is a weighting coefficient, and y is the quantized value corresponding to the data size that is corresponding to the access request of accessing the memory node and that is in the access feature in the next time period. A larger data amount that is corresponding to the access request and that is in the feature of the memory node to be accessed by the computation node indicates a higher priority of the optical link that needs to be established between the computation node and the memory node.

If only a ratio that is of requests for reading data from a memory node to requests for writing data into the memory node and that is in an access feature is considered, according to a quantized value corresponding to a ratio that is of requests for reading data from a memory node to requests for writing data into the memory node and that is in the next time period, priority indication information of an optical link that needs to be established between the computation node and the memory node is determined. For example, the priority indication information of the optical link that needs to be established between the computation node and the memory node is W=cz, c is a weighting coefficient, and z is the quantized value corresponding to the ratio that is of requests for reading data from the memory node to requests for writing data into the memory node and that is in the next time period. A higher ratio of requests for reading data from the memory node by the computation node to requests for writing data into the memory node by the computation node indicates a higher priority of the optical link that needs to be established between the computation node and the memory node. Because an application program usually needs to perform subsequent processing only after data that is requested in a data reading request is returned, a priority of the data reading request is higher than a priority of a data writing request.

If only distribution of an accessed memory address in an access feature is considered, according to a quantized value corresponding to a total quantity of access requests in the next time period and that corresponding to a quantity of access requests for requesting to access a contiguous memory address in the next time period, priority indication information of an optical link that needs to be established between the computation node and a memory node is determined. For example, the priority indication information of the optical link that needs to be established between the computation node and the memory node is W=de, d is a weighting coefficient, and e is defined as a value obtained by dividing a quantity of access requests for requesting to access a same memory node and a contiguous memory address in the next time period by a total quantity of access requests for requesting to access the memory node in the next time period. Alternatively, according to a quantized value corresponding to a total quantity of access requests in the next time period and that corresponding to a quantity of access requests for requesting to access a same memory address segment in the next time period, priority indication information of an optical link that needs to be established between the computation node and a memory node is determined. For example, the priority indication information of the optical link that needs to be established between the computation node and the memory node is W=de, d is a weighting coefficient, and e is defined as a value obtained by dividing a quantity of access requests for requesting to access a same memory node and a same memory address segment in the next time period by a total quantity of access requests for requesting to access the memory node in the next time period. A larger value of e indicates a higher priority of the optical link that needs to be established between the computation node and the memory node.

If a priority of an optical link that needs to be established between the computation node and a memory node is determined by comprehensively considering at least two access features, according to a quantized value corresponding to each access feature of a memory node to be accessed in the next time period, priority indication information of the optical link that needs to be established between the computation node and the memory node is determined. For example, if two access features are comprehensively considered, the priority indication information of the optical link that needs to be established between the computation node and the memory node is W=ax+by, x represents a quantized value corresponding to a first access feature of the memory node to be accessed in the next time period, a is a weighting coefficient corresponding to the first access feature, y represents a quantized value corresponding to a second access feature of the memory node to be accessed in the next time period, and b is a weighting coefficient corresponding to the second access feature. For example, if three access features are comprehensively considered, the priority indication information of the optical link that needs to be established between the computation node and the memory node is W=ax+by+cz, x represents a quantized value corresponding to a first access feature of the memory node to be accessed in the next time period, a is a weighting coefficient corresponding to the first access feature, y represents a quantized value corresponding to a second access feature of the memory node to be accessed in the next time period, b is a weighting coefficient corresponding to the second access feature, z represents a quantized value corresponding to a third access feature of the memory node to be accessed in the next time period, and c is a weighting coefficient corresponding to the third access feature. For example, if four access features are comprehensively considered, the priority indication information of the optical link that needs to be established between the computation node and the memory node is W=ax+by+cz+de, x represents a quantized value corresponding to a first access feature of the memory node to be accessed in the next time period, a is a weighting coefficient corresponding to the first access feature, y represents a quantized value corresponding to a second access feature of the memory node to be accessed in the next time period, b is a weighting coefficient corresponding to the second access feature, z represents a quantized value corresponding to a third access feature of the memory node to be accessed in the next time period, c is a weighting coefficient corresponding to the third access feature, e represents a quantized value corresponding to a fourth access feature of the memory node to be accessed in the next time period, and d is a weighting coefficient corresponding to the fourth access feature.

Step 204: The computation node generates an optical link establishment request, and sends the optical link establishment request to an optical switch chip, where the optical link establishment request carries an identifier of the computation node and the identifier of each memory node that needs to be accessed in the next time period, and carries the priority indication information of the optical link that needs to be established in the next time period between the computation node and the memory node that needs to be accessed.

During specific implementation, the priority indication information of the optical link that needs to be established between the computation node and the memory node that needs to be accessed may be a specific value, and a larger value indicates a higher priority.

Figure 3:
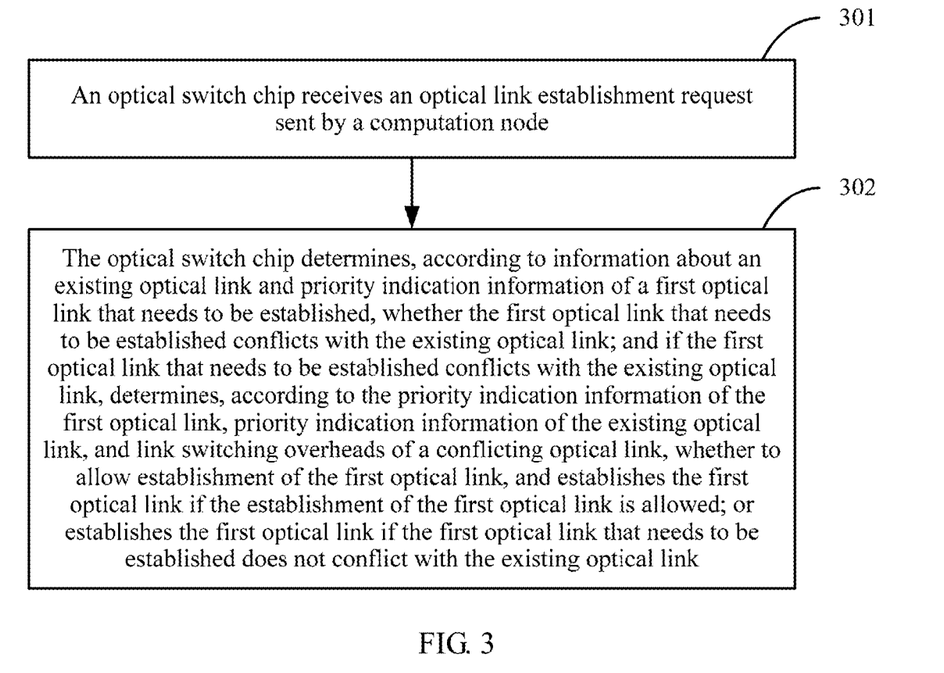
FIG. 3 is a schematic flowchart of executing an optical switch control method by an optical switch chip according to an embodiment of the present disclosure.

In an embodiment of the present disclosure, as shown in FIG. 3, a detailed process in which an optical switch chip performs optical switch control is as follows.

Step 301: The optical switch chip receives an optical link establishment request sent by a computation node.

The optical link establishment request carries an identifier of the computation node, an identifier of a memory node that needs to be accessed by the computation node, and priority indication information of a first optical link that needs to be established between the computation node and the memory node that needs to be accessed by the computation node.

Step 302: The optical switch chip determines, according to information about an existing optical link and priority indication information of a first optical link that needs to be established, whether the first optical link that needs to be established conflicts with the existing optical link; and if the first optical link that needs to be established conflicts with the existing optical link, determines, according to the priority indication information of the first optical link, priority indication information of the existing optical link, and link switching overheads of a conflicting optical link, whether to allow establishment of the first optical link, and establishes the first optical link if the establishment of the first optical link is allowed; or establishes the first optical link if the first optical link that needs to be established does not conflict with the existing optical link.

The conflicting optical link is an optical link that is in the existing optical link and that conflicts with the first optical link.

If the first optical link and the existing optical link have a same optical fiber or port, the optical switch chip determines that the first optical link conflicts with the existing optical link; or if the first optical link and the existing optical link do not have a same optical fiber or port, the optical switch chip determines that the first optical link does not conflict with the existing optical link.

The determining, by the optical switch chip according to the priority indication information of the first optical link, priority indication information of the existing optical link, and link switching overheads of a conflicting link, whether to allow establishment of the first optical link is specifically as follows:

determining, by the optical switch chip, whether the link switching overheads of the conflicting optical link are greater than a preset value; and if the link switching overheads of the conflicting optical link are greater than the preset value, disallowing the establishment of the first optical link; or if the link switching overheads of the conflicting optical link are not greater than the preset value, determining, according to the priority indication information of the first optical link and priority indication information of the conflicting optical link, whether a priority of the first optical link is higher than a priority of the conflicting optical link; and allowing the establishment of the first optical link if the priority of the first optical link is higher than the priority of the conflicting optical link; or disallowing the establishment of the first optical link if the priority of the first optical link is not higher than the priority of the conflicting optical link.

During specific implementation, the optical switch chip obtains a first preset value corresponding to the priority indication information of the first optical link; obtains a second preset value corresponding to the priority indication information of the optical link that is in the existing optical link and conflicts with the first optical link; obtains a third preset value corresponding to the link switching overheads of the optical link that is in the existing optical link and conflicts with the first optical link; calculates a ratio of the first preset value to the third preset value, to obtain a first ratio; calculates a ratio of the second preset value to the third preset value, to obtain a second ratio; and if determining that the first ratio is greater than a preset threshold and the first ratio is greater than the second ratio, determines to allow the establishment of the first optical link; if determining that the first ratio is not greater than a preset threshold or the first ratio is not greater than the second ratio, determines to disallow the establishment of the first optical link.

In this embodiment, the link switching overheads of the conflicting optical link are determined according to a link re-arrangement time, an optical receiver lock time, and a data link switching and recovery time. The link re-arrangement time is defined as a time required for disconnecting the conflicting optical link and establishing the first optical link. The optical receiver lock time is defined as a required time from establishment of the first optical link to a time point at which an optical receiver can stably receive an optical signal. The data link switching and recovery time is defined as a verification code sending and receiving time required for ensuring that data can be correctly received on the newly-established optical link.

For example, quantization processing is performed on indicators such as priority indication information of an optical link and link switching overheads of the optical link. It is assumed that a quantized value corresponding to a high priority is 10, a quantized value corresponding to a normal priority is 5, and a quantized value corresponding to a low priority is 1. It is assumed that a quantized value corresponding to link switching overheads of a 2-millisecond (ms) delay is 2000, a quantized value corresponding to link switching overheads of a 1-ms delay is 200, and a quantized value corresponding to link switching overheads of a 100-nanosecond (ns) delay is 100. A balanced quantized value is defined as a ratio of a priority of an optical link to link switching overheads. It is assumed that the priority indication information of the first optical link indicates that the first optical link has a high priority, that is, a value corresponding to the priority indication information of the first optical link is 10, and that the priority indication information of the conflicting optical link indicates that the conflicting optical link has a normal priority, that is, a value corresponding to the conflicting optical link is 5. It is assumed that the link switching overheads of the conflicting optical link is 1 ms, that is, a value corresponding to the link switching overheads of the conflicting optical link is 200. By means of calculation, the first ratio is 10/200, and the second ratio is 5/200. It is determined that the first ratio is greater than the preset threshold 0.01 and the first ratio is greater than the second ratio. Therefore, the establishment of the first optical link is allowed.

The following describes, by using a specific embodiment, a process of establishing an optical link in advance as follows.

In a computer system in which a big data application is run, such as a Terasort sorting application in a Hadoop-based execution framework, a main function of the application is to read massive data in a storage, and sort all the data. Because Terasort processes a relatively large amount of data, a large amount of data is stored in a memory node, and a processing process of sorting is completed by the computation node. Therefore, the computation node needs to frequently read data from or write data into each memory node. The computer system usually includes multiple computation nodes and multiple memory nodes.

The Hadoop-based execution framework mainly includes two computation nodes: a Map node and a Reduce node. In the computer system, the Terasort application is frequently executed. Therefore, the Map computation node and the Reduce computation node frequently perform an operation alternately. That is, a running phase of the computer system is relatively obviously regular. A Reduce operation is used as an example. The Reduce node needs to read data that is stored on one or more memory nodes and that is generated by the Map node, and sort and integrate the data. Because a task performed by the Map node is divided evenly, the Reduce node basically accesses all memory nodes. Therefore, an operation performed by the Reduce node is highly regular, and features in all processing phases of all memory nodes accessed by the Reduce node are relatively similar. Similarly, a processing phase of the Map node is also regular.

Figure 4:
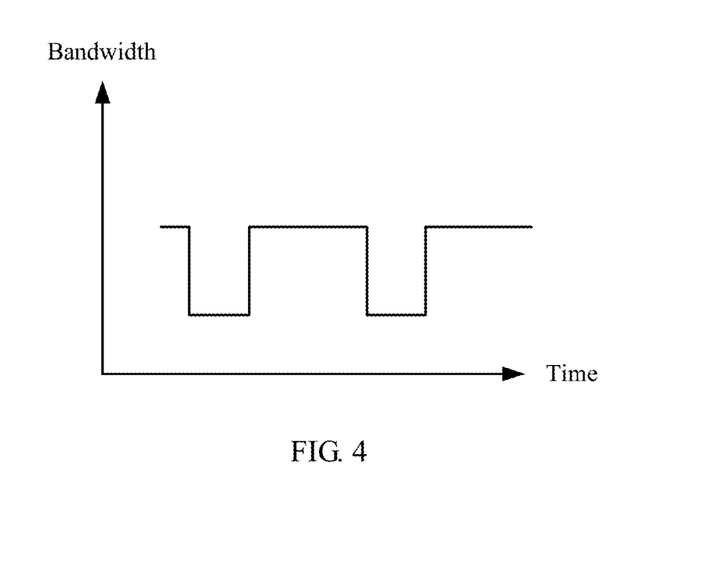
FIG. 4 is a schematic diagram of a relationship between a bandwidth and time according to an embodiment of the present disclosure.

It is assumed that the computation node collects access features, such as an access bandwidth, a size of requested data, or a ratio of reading requests to writing requests, of all memory nodes accessed by the computation node in each time period by using 1 second (s) as the time period. Processing phases of the TeraSort application are differentiated according to the access features of all the memory nodes accessed by the computation node in each time period. As shown in FIG. 4, FIG. 4 shows a diagram of a relationship in which a memory bandwidth in each processing phase of the Map node varies with time. When the Map node reads data from a memory node to the computation node, a bandwidth of the accessed memory node is relatively high.

During a data sorting phase, a bandwidth of the accessed memory node is relatively low, and a data comparison and sorting operation is mainly performed.

The computation node records an access feature that is of a memory node accessed by the computation node and that is corresponding to one or more time periods, for example, a bandwidth of the accessed memory node. Because the memory node accessed by the computation node has many access features, processing phases corresponding to different time periods cannot be differentiated intuitively, and one or more representative features, for example, a bandwidth of the accessed memory node and distribution of sizes of requested data, need to be extracted by using an algorithm such as a clustering algorithm. All time periods are classified by using the representative feature, to obtain multiple processing phases. For example, as shown in FIG. 4, the processing phase may fall into two types, that is, a high memory bandwidth type and a low memory bandwidth type. In addition, the time periods and corresponding processing phase classification are recorded and used as a phase feature library.

In a new time period, access features of memory nodes accessed in recent time periods are analyzed, and are compared with an access feature that is in the phase feature library, of an accessed memory node, and is corresponding to each time period, so as to find a similar feature. For example, it is assumed that bandwidths that are of accessed memory nodes, stored in the phase feature library, and corresponding to adjacent time periods are respectively a high bandwidth and a low bandwidth, that is, bandwidths of accessed memory nodes in all time periods are successively as follows: a "high memory bandwidth", a "low memory bandwidth", a "high memory bandwidth", and a "low memory bandwidth" . . . . If a bandwidth of an accessed memory node in a current time period is a "low memory bandwidth", it may be predicted that a bandwidth corresponding to a next time period is a "high memory bandwidth".

According to the prediction result, the computation node determines that a memory access bandwidth of a computation node A and that of a memory node B in the next time period are relatively high, and determines, according to a quantized value corresponding to each of the memory access bandwidth of the computation node A and that of the memory node B in the next time period, priority indication information of an optical link that needs to be established between the computation node A and the memory node B. The computation node sends, to the optical switch chip, an optical link advance establishment request that instructs to "establish a data transmission channel between the computation node A and the memory node B in advance".

After receiving the optical link advance establishment request, the optical switch chip determines whether an existing optical link conflicts with the optical link that needs to be established between the computation node A and the memory node B. If the existing optical link does not conflict with the optical link that needs to be established between the computation node A and the memory node B, the optical switch chip establishes the optical link between the computation node A and the memory node B. If the existing optical link conflicts with the optical link that needs to be established between the computation node A and the memory node B, the optical switch chip determines, according to the priority indication information of the optical link that needs to be established between the computation node A and the memory node B, and priority indication information and optical link switching overheads of a conflicting optical link, whether to allow establishment of the optical link between the computation node A and the memory node B.

It should be noted that only a simple typical application scenario is described in the specific embodiment. In actual application, a feature in a processing phase is more complex, and a conflict resolution manner is more flexible, but both are consistent with the idea described in the specific embodiment. Details are not described herein one by one.

Figure 5:
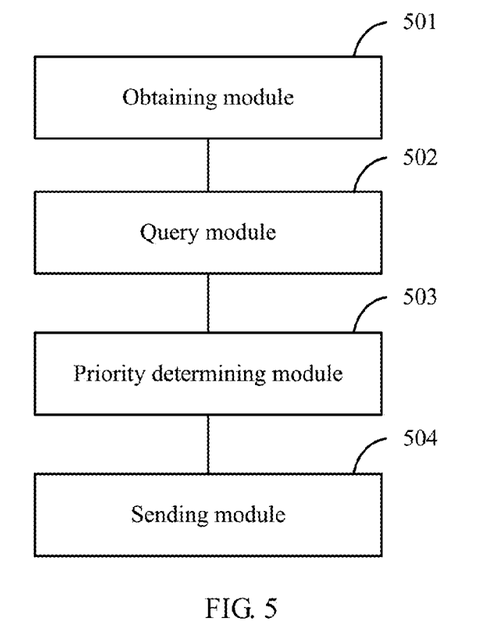
FIG. 5 is a schematic structural diagram of a computation node according to an embodiment of the present disclosure.

Based on a same disclosure concept, an embodiment of the present disclosure further provides a computation node. For specific implementation of the computation node, refer to description of the computation node in the foregoing method embodiment. No repeated description is provided. As shown in FIG. 5, the computation node mainly includes:

an obtaining module 501, configured to: receive a request for accessing a memory node in one or more time periods, and obtain an identifier and an access feature of a memory node accessed in the one or more time periods, where the access feature includes any one or a combination of multiple of a bandwidth of the accessed memory node, address distribution of the accessed memory node, a distribution status of access requests corresponding to different amounts of data, and a ratio of requests for reading data from the memory node to requests for writing data into the memory node;

a query module 502, configured to: search a phase feature library according to the identifier and the access feature of the memory node accessed in the one or more time periods, where the phase feature library stores an identifier and an access feature of each memory node that needs to be accessed by the computation node in each time period in each processing phase; determine, from the phase feature library, a processing phase to which a time period matching the identifier and the access feature of the memory node accessed in the one or more time periods belongs; and obtain an identifier and an access feature of each memory node that needs to be accessed in a next time period of the matched time period in the determined processing phase;

a priority determining module 503, configured to determine, according to a quantized value corresponding to the access feature of each memory node that needs to be accessed in the next time period, priority indication information of an optical link that needs to be established between the computation node and each memory node that needs to be accessed in the next time period; and a sending module 504, configured to: generate an optical link establishment request, and send the optical link establishment request to an optical switch chip, where the optical link establishment request carries an identifier of the computation node and the identifier of each memory node that needs to be accessed in the next time period, and carries the priority indication information of the optical link that needs to be established in the next time period between the computation node and the memory node that needs to be accessed.

Specifically, the query module 502 is specifically configured to:

search data in a table of the phase feature library, determine data that is in the table and matches the identifier and the access feature of the memory node accessed in the one or more time periods, and determine a processing phase corresponding to the matched data in the table.

During implementation, the computation node further includes a phase feature library establishment module, configured to:

obtain an identifier and an access feature of a memory node accessed in each time period, cluster all time periods according to the access feature in each time period, and divide a processing process of the computation node into multiple processing phases according to a clustering result, where each processing phase includes identifiers and access features of memory nodes accessed in an integer quantity of time periods, so as to obtain the phase feature library.

Figure 6:
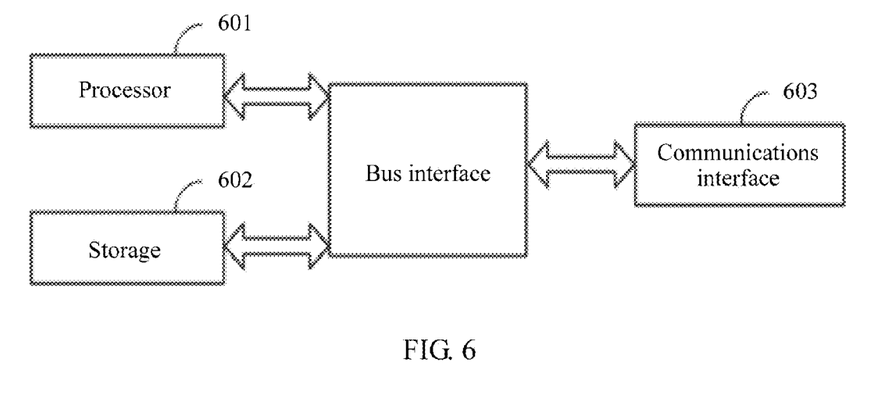
FIG. 6 is a schematic structural diagram of another computation node according to an embodiment of the present disclosure.

Based on a same disclosure concept, an embodiment of the present disclosure further provides another computation node. As shown in FIG. 6, the computation node mainly includes a processor 601, a storage 602, and a communications interface 603. The storage stores a preset program, and the processor reads the program in the storage, and executes the following process according to the program:

receiving a request for accessing a memory node in one or more time periods, and obtaining an identifier and an access feature of the memory node accessed in the one or more time periods, where the access feature includes any one or a combination of multiple of a bandwidth of the accessed memory node, address distribution of the accessed memory node, a distribution status of access requests corresponding to different amounts of data, and a ratio of requests for reading data from the memory node to requests for writing data into the memory node;

searching a phase feature library according to the identifier and the access feature of the memory node accessed in the one or more time periods, where the phase feature library stores an identifier and an access feature of each memory node that needs to be accessed by the computation node in each time period in each processing phase; determining, from the phase feature library, a processing phase to which a time period matching the identifier and the access feature of the memory node accessed in the one or more time periods belongs; and obtaining an identifier and an access feature of each memory node that needs to be accessed in a next time period of the matched time period in the determined processing phase;

determining, according to a quantized value corresponding to the access feature of each memory node that needs to be accessed in the next time period, priority indication information of an optical link that needs to be established between the computation node and each memory node that needs to be accessed in the next time period; and generating an optical link establishment request, and sending the optical link establishment request to an optical switch chip by using the communications interface 603, where the optical link establishment request carries an identifier of the computation node and the identifier of each memory node that needs to be accessed in the next time period, and carries the priority indication information of the optical link that needs to be established in the next time period between the computation node and the memory node that needs to be accessed.

Specifically, the processor 601 searches data in a table of the phase feature library, determines data that is in the table and matches the identifier and the access feature of the memory node accessed in the one or more time periods, and determines a processing phase corresponding to the matched data in the table.

During implementation, the processor 601 is further configured to establish the phase feature library, and the establishment is specifically comprising: obtaining an identifier and an access feature of a memory node accessed in each time period, clustering all time periods according to the access feature in each time period, and dividing a processing process of the computation node into multiple processing phases according to a clustering result, where each processing phase includes identifiers and access features of memory nodes accessed in an integer quantity of time periods, so as to obtain the phase feature library.

In this embodiment of the present disclosure, a manner in which the optical link establishment request is transmitted by using the communications interface is not limited. The optical link establishment request may be transmitted to the optical switch chip in a form of an optical signal obtained by means of conversion, or may be transmitted to the optical switch chip in a form of a packet, provided that the optical link establishment request can be sent to the optical switch chip and the optical switch chip can parse the received optical link establishment request.

A bus architecture may include any quantity of interconnected buses and bridges, and specifically link various circuits of one or more processors represented by the processor and a storage represented by the storage. The bus architecture may further link various other circuits such as a peripheral device, a voltage regulator, and a power management circuit. This is well known in the art, and therefore, this specification provides no further description. A bus interface provides an interface. The processor is responsible for bus architecture management and general processing, and the storage may store data used when the processor performs an operation.

Figure 7:
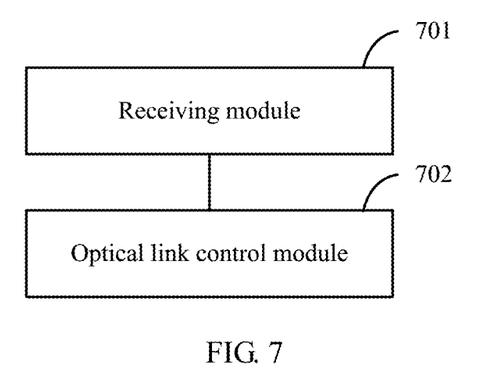
FIG. 7 is a schematic structural diagram of an optical switch chip according to an embodiment of the present disclosure.

Based on a same disclosure concept, an embodiment of the present disclosure further provides an optical switch chip. For specific implementation of the optical switch chip, refer to description of the optical switch chip in the foregoing method embodiment. No repeated description is provided. As shown in FIG. 7, the optical switch chip mainly includes:

a receiving module 701, configured to receive an optical link establishment request sent by a computation node, where the optical link establishment request carries an identifier of the computation node, an identifier of a memory node that needs to be accessed by the computation node, and priority indication information of a first optical link that needs to be established between the computation node and the memory node that needs to be accessed by the computation node; and an optical link control module 702, configured to: determine, according to information about an existing optical link and the priority indication information of the first optical link that needs to be established, whether the first optical link that needs to be established conflicts with the existing optical link; and if the first optical link that needs to be established conflicts with the existing optical link, determine, according to the priority indication information of the first optical link, priority indication information of the existing optical link, and link switching overheads of a conflicting optical link, whether to allow establishment of the first optical link, and establish the first optical link if the establishment of the first optical link is allowed; or establish the first optical link if the first optical link that needs to be established does not conflict with the existing optical link.

During implementation, if determining that the first optical link that needs to be established and the existing optical link have a same optical fiber or port, the optical link control module 702 determines that the first optical link that needs to be established conflicts with the existing optical link; or if determining that the first optical link that needs to be established and the existing optical link do not have a same optical fiber or port, the optical link control module 702 determines that the first optical link that needs to be established does not conflict with the existing optical link.

During implementation, the optical link control module 702 is specifically configured to: determine whether the link switching overheads of the conflicting optical link are greater than a preset value; and if the link switching overheads of the conflicting optical link are greater than the preset value, disallow the establishment of the first optical link; or if the link switching overheads of the conflicting optical link are not greater than the preset value, determine, according to the priority indication information of the first optical link and priority indication information of the conflicting optical link, whether a priority of the first optical link is higher than a priority of the conflicting optical link; and allow the establishment of the first optical link if the priority of the first optical link is higher than the priority of the conflicting optical link; or disallow the establishment of the first optical link if the priority of the first optical link is not higher than the priority of the conflicting optical link.

The link switching overheads of the conflicting optical link are determined according to a link re-arrangement time, an optical receiver lock time, and a data link switching and recovery time. The link re-arrangement time is defined as a time required for disconnecting the conflicting optical link and establishing the first optical link. The optical receiver lock time is defined as a required time from establishment of the first optical link to a time point at which an optical receiver can stably receive an optical signal. The data link switching and recovery time is defined as a verification code sending and receiving time required for ensuring that data can be correctly received on the newly-established optical link.

Figure 8:
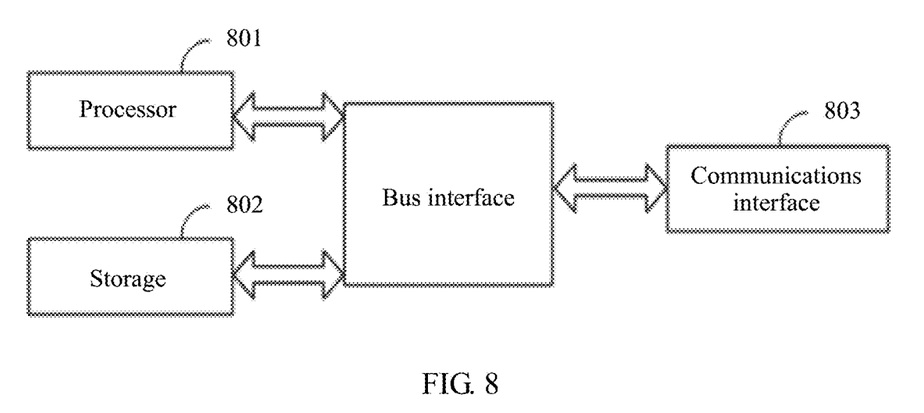
FIG. 8 is a schematic structural diagram of another optical switch chip according to an embodiment of the present disclosure.

Based on a same disclosure concept, an embodiment of the present disclosure further provides another optical switch chip. For specific implementation of the optical switch chip, refer to description of the optical switch chip in the foregoing method embodiment. No repeated description is provided. As shown in FIG. 8, the optical switch chip mainly includes a processor 801, a storage 802, and a communications interface 803. The storage 802 stores a preset program, and the processor 801 reads the program in the storage 802, and executes the following process according to the program:

receiving, by using the communications interface 803, an optical link establishment request sent by a computation node, where the optical link establishment request carries an identifier of the computation node, an identifier of a memory node that needs to be accessed by the computation node, and priority indication information of a first optical link that needs to be established between the computation node and the memory node that needs to be accessed by the computation node; and determining, according to information about an existing optical link and the priority indication information of the first optical link that needs to be established, whether the first optical link that needs to be established conflicts with the existing optical link; and if the first optical link that needs to be established conflicts with the existing optical link, determining, according to the priority indication information of the first optical link, priority indication information of the existing optical link, and link switching overheads of a conflicting optical link, whether to allow establishment of the first optical link, and establishing the first optical link if the establishment of the first optical link is allowed; or establishing the first optical link if the first optical link that needs to be established does not conflict with the existing optical link.

During implementation, the processor 801 is specifically configured to: if determining that the first optical link that needs to be established and the existing optical link have a same optical fiber or port, determine that the first optical link that needs to be established conflicts with the existing optical link; or if determining that the first optical link that needs to be established and the existing optical link do not have a same optical fiber or port, determine that the first optical link that needs to be established does not conflict with the existing optical link.

During implementation, the processor 801 is specifically configured to:

determine whether the link switching overheads of the conflicting optical link are greater than a preset value; and if the link switching overheads of the conflicting optical link are greater than the preset value, disallow the establishment of the first optical link; or if the link switching overheads of the conflicting optical link are not greater than the preset value, determine, according to the priority indication information of the first optical link and priority indication information of the conflicting optical link, whether a priority of the first optical link is higher than a priority of the conflicting optical link; and allow the establishment of the first optical link if the priority of the first optical link is higher than the priority of the conflicting optical link; or disallow the establishment of the first optical link if the priority of the first optical link is not higher than the priority of the conflicting optical link.

During implementation, the link switching overheads of the conflicting optical link are determined according to a link re-arrangement time, an optical receiver lock time, and a data link switching and recovery time. The link re-arrangement time is defined as a time required for disconnecting the conflicting optical link and establishing the first optical link. The optical receiver lock time is defined as a required time from establishment of the first optical link to a time point at which an optical receiver can stably receive an optical signal. The data link switching and recovery time is defined as a verification code sending and receiving time required for ensuring that data can be correctly received on the newly-established optical link.

In this embodiment of the present disclosure, a manner in which the optical link establishment request is transmitted by using the communications interface is not limited. The optical link establishment request may be transmitted in a form of an optical signal, and the received optical link establishment request is parsed after being converted into a packet; or the optical link establishment request may be directly transmitted in a form of a packet, provided that the optical link establishment request can be correctly received and parsed.

A bus architecture may include any quantity of interconnected buses and bridges, and specifically link various circuits of one or more processors represented by the processor and a storage represented by the storage. The bus architecture may further link various other circuits such as a peripheral device, a voltage regulator, and a power management circuit. This is well known in the art, and therefore, this specification provides no further description. A bus interface provides an interface. The processor is responsible for bus architecture management and general processing, and the storage may store data used when the processor performs an operation.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. An optical switch control method, comprising:

receiving, by an optical switch chip, a first optical link establishment request sent by a computation node, wherein the first optical link establishment request carries an identifier of the computation node, an identifier of a first memory node to be accessed by the computation node, and first priority indication information of a first optical link to be established between the computation node and the first memory node;

determining, by the optical switch chip according to information about an existing optical link and the first priority indication information, the first optical link to be established conflicts with the existing optical link;

determining, by the optical switch chip, according to the first priority indication information, priority indication information of the existing optical link and link switching overheads of a first conflicting optical link, to allow establishment of the first optical link when the first optical link to be established conflicts with the existing optical link; and establishing the first optical link when the establishment of the first optical link is allowed.

2. The method according to claim 1, wherein determining, by the optical switch chip, the first optical link to be established conflicts with the existing optical link comprises:

determining that the first optical link to be established and the existing optical link have a same optical fiber or port.

3. The method according to claim 1, wherein determining, by the optical switch chip according to the first priority indication information, priority indication information of the existing optical link and link switching overheads of a first conflicting optical link, to allow establishment of the first optical link comprises:

determining, by the optical switch chip, the link switching overheads of the first conflicting optical link are greater than a preset value;

determining, according to the first priority indication information and priority indication information of the first conflicting optical link, a priority of the first optical link is higher than a priority of the first conflicting optical link; and allowing the establishment of the first optical link when the priority of the first optical link is higher than the priority of the first conflicting optical link.

4. The method according to claim 1, further comprising:

receiving, by the optical switch chip, a second optical link establishment request sent by the computation node, wherein the second optical link establishment request carries the identifier of the computation node, an identifier of a second memory node to be accessed by the computation node, and second priority indication information of a second optical link to be established between the computation node and the second memory node;

determining, by the optical switch chip according to information about the existing optical link and the second priority indication information, the second optical link to be established does not conflict with the existing optical link; and establishing the second optical link when the second optical link to be established does not conflict with the existing optical link.

5. The method according to claim 1, further comprising:

receiving, by the optical switch chip, a third optical link establishment request sent by the computation node, wherein the third optical link establishment request carries the identifier of the computation node, an identifier of a third memory node to be accessed by the computation node, and third priority indication information of a third optical link to be established between the computation node and the third memory node;

determining, by the optical switch chip according to information about the existing optical link and the third priority indication information, the third optical link to be established conflicts with the existing optical link;

determining, by the optical switch chip according to the third priority indication information, priority indication information of the existing optical link and link switching overheads of a second conflicting optical link, not to allow establishment of the third optical link when the third optical link to be established conflicts with the existing optical link.

6. The method according to claim 5, wherein determining, by the optical switch chip according to the third priority indication information, priority indication information of the existing optical link and link switching overheads of a second conflicting optical link, not to allow establishment of the third optical link when the third optical link to be established conflicts with the existing optical link, comprises:

determining, by the optical switch chip, the link switching overheads of the second conflicting optical link are not greater than a preset value.

7. The method according to claim 5, wherein determining, by the optical switch chip according to the third priority indication information, priority indication information of the existing optical link and link switching overheads of a second conflicting optical link, not to allow establishment of the third optical link when the third optical link to be established conflicts with the existing optical link, comprises:

determining, by the optical switch chip according to the third priority indication information and priority indication information of the second conflicting optical link, a priority of the third optical link is not higher than a priority of the second conflicting optical link.

8. The method according to claim 1, wherein the link switching overheads of the first conflicting optical link are determined according to a link re-arrangement time, an optical receiver lock time, and a data link switching and recovery time.

9. An optical switch control method, applied to communication between a computation node and a memory node, wherein an optical link for communication is established between the computation node and the memory node by using an optical switch chip, and the method comprises:

receiving, by the computation node, a request for accessing a memory node in one or more time periods, and obtaining an identifier and an access feature of the memory node accessed in the one or more time periods, wherein the access feature comprises any one or a combination of multiple of a bandwidth of the accessed memory node, address distribution of the accessed memory node, a distribution status of access requests corresponding to different amounts of data, and a ratio of requests for reading data from the memory node to requests for writing data into the memory node;

searching, by the computation node, a phase feature library according to the identifier and the access feature of the memory node accessed in the one or more time periods, wherein the phase feature library stores an identifier and an access feature of each memory node to be accessed by the computation node in each time period in each processing phase;

determining, from the phase feature library, a processing phase to which a time period matching the identifier and the access feature of the memory node accessed in the one or more time periods belongs; and obtaining an identifier and an access feature of each memory node to be accessed in a next time period of the matched time period in the determined processing phase;

determining, by the computation node according to a quantized value corresponding to the access feature of each memory node that needs to be accessed in the next time period, priority indication information of an optical link to be established between the computation node and each memory node to be accessed in the next time period;

generating, by the computation node, an optical link establishment request, and sending the optical link establishment request to the optical switch chip, wherein the optical link establishment request carries an identifier of the computation node and the identifier of each memory node that needs to be accessed in the next time period, and carries the priority indication information of the optical link that needs to be established in the next time period between the computation node and each memory node that needs to be accessed.

10. The method according to claim 9, wherein searching, by the computation node, a phase feature library according to the identifier and the access feature of the memory node accessed in the one or more time periods, and determining, from the phase feature library, a processing phase to which a time period matching the identifier and the access feature of the memory node accessed in the one or more time periods belongs comprises:

searching, by the computation node, data in a table of the phase feature library;

determining data that is in the table matches the identifier and the access feature of the memory node accessed in the one or more time periods; and determining a processing phase corresponding to the matched data in the table.

11. An optical switch chip, comprising:
a processor; and
storage having a plurality of stored instructions that, when executed by the processor, cause the optical switch chip to:
receive, a first optical link establishment request sent by a computation node, wherein the first optical link establishment request carries an identifier of the computation node, an identifier of a first memory node to be accessed by the computation node, and first priority indication information of a first optical link to be established between the computation node and the first memory node,
determine, according to information about an existing optical link and the first priority indication information, the first optical link to be established conflicts with the existing optical link,
determine, according to the first priority indication information, priority indication information of the existing optical link and link switching overheads of a first conflicting optical link, to allow establishment of the first optical link when the first optical link to be established conflicts with the existing optical link, and
establish the first optical link when the establishment of the first optical link is allowed.

12. The optical switch chip according to claim 11, wherein the plurality of stored instructions, when executed by the processor, further cause the optical switch chip to:
determine that the first optical link to be established conflicts with the existing optical link when the first optical link to be established and the existing optical link have a same optical fiber or port.

13. The optical switch chip according to claim 11, wherein the plurality of stored instructions, when executed by the processor, further cause the optical switch chip to:
determine the link switching overheads of the first conflicting optical link are greater than a preset value;
determine, according to the first priority indication information and priority indication information of the first conflicting optical link, a priority of the first optical link is higher than a priority of the first conflicting optical link;
allow the establishment of the first optical link when the priority of the first optical link is higher than the priority of the first conflicting optical link.

14. The optical switch chip according to claim 11, wherein the plurality of stored instructions, when executed by the processor, further cause the optical switch chip to:
receive, a second optical link establishment request sent by the computation node, wherein the second optical link establishment request carries the identifier of the computation node, an identifier of a second memory node to be accessed by the computation node, and second priority indication information of a second optical link to be established between the computation node and the second memory node;
determine, according to information about the existing optical link and the second priority indication information, the second optical link to be established does not conflict with the existing optical link;
establish the second optical link when the second optical link to be established does not conflict with the existing optical link.

15. The optical switch chip according to claim 11, wherein the plurality of stored instructions, when executed by the processor, further cause the optical switch chip to:
receive, by an optical switch chip, a third optical link establishment request sent by the computation node, wherein the third optical link establishment request carries the identifier of the computation node, an identifier of a third memory node to be accessed by the computation node, and third priority indication information of a third optical link to be established between the computation node and the third memory node;
determine, according to information about the existing optical link and the third priority indication information, the third optical link to be established conflicts with the existing optical link;
determine, according to the third priority indication information, priority indication information of the existing optical link, and link switching overheads of a second conflicting optical link, not to allow establishment of the third optical link when the third optical link to be established conflicts with the existing optical link.

16. The optical switch chip according to claim 15, wherein the plurality of stored instructions, when executed by the processor, further cause the optical switch chip to:
determine not to allow establishment of the third optical link when the link switching overheads of the second conflicting optical link are not greater than a preset value.

17. The optical switch chip according to claim 15, wherein the plurality of stored instructions, when executed by the processor, further cause the optical switch chip to:
determine not to allow establishment of the third optical link when a priority of the third optical link is not higher than a priority of the second conflicting optical link.

18. The optical switch chip according to claim 11, wherein the link switching overheads of the first conflicting optical link are determined according to a link re-arrangement time, an optical receiver lock time, and a data link switching and recovery time.

* * * * *